United States Patent
Ball et al.

[11] Patent Number: 6,031,849
[45] Date of Patent: Feb. 29, 2000

[54] HIGH POWER THREE LEVEL FIBER LASER AND METHOD OF MAKING SAME

[75] Inventors: Gary A. Ball, Simsbury; Paul Sanders, Madison, both of Conn.

[73] Assignee: JDS Uniphase Corporation, San Jose, Calif.

[21] Appl. No.: 08/971,472

[22] Filed: Nov. 14, 1997

[51] Int. Cl.⁷ .............................. H01S 3/30; H01S 3/00; G02B 6/26; C03B 37/023
[52] U.S. Cl. .............................. 372/6; 385/28; 385/123; 385/126; 385/127; 65/385; 359/341
[58] Field of Search .............................. 372/6; 385/28, 385/123, 126, 127; 65/385, 392, 414, 421, 437; 359/341, 342, 345, 346

[56] References Cited

U.S. PATENT DOCUMENTS

| | | | |
|---|---|---|---|
| 4,284,663 | 8/1981 | Carruthers et al. | 65/385 |
| 4,782,491 | 11/1988 | Snitzer | 372/6 |
| 4,815,079 | 3/1989 | Snitzer et al. | 372/6 |
| 4,953,939 | 9/1990 | Epworth et al. | 385/37 |
| 4,984,861 | 1/1991 | Suchoski, Jr. et al. | 385/14 |
| 5,026,137 | 6/1991 | Tokumitsu | 385/24 |
| 5,107,360 | 4/1992 | Huber | 359/124 |
| 5,115,338 | 5/1992 | DiGiovanni et al. | 359/337 |
| 5,119,447 | 6/1992 | Trisno | 385/3 |
| 5,134,620 | 7/1992 | Huber | 372/6 |
| 5,140,456 | 8/1992 | Huber | 359/341 |
| 5,148,503 | 9/1992 | Skeie | 385/3 |
| 5,151,908 | 9/1992 | Huber | 372/6 |
| 5,153,762 | 10/1992 | Huber | 359/125 |
| 5,159,601 | 10/1992 | Huber | 372/6 |
| 5,166,821 | 11/1992 | Huber | 359/238 |
| 5,168,534 | 12/1992 | McBrien et al. | 385/3 |
| 5,187,760 | 2/1993 | Huber | 385/37 |
| 5,191,586 | 3/1993 | Huber | 372/6 |
| 5,200,964 | 4/1993 | Huber | 372/26 |
| 5,208,819 | 5/1993 | Huber | 372/32 |
| 5,210,631 | 5/1993 | Huber et al. | 359/132 |
| 5,210,633 | 5/1993 | Trisno | 359/194 |
| 5,222,089 | 6/1993 | Huber | 372/26 |
| 5,231,529 | 7/1993 | Kaede | 359/124 |
| 5,243,609 | 9/1993 | Huber | 372/19 |
| 5,257,124 | 10/1993 | Glaab et al. | 359/124 |
| 5,257,125 | 10/1993 | Maeda | 359/196 |
| 5,260,823 | 11/1993 | Payne et al. | 359/341 |
| 5,268,910 | 12/1993 | Huber | 372/6 |
| 5,271,024 | 12/1993 | Huber | 372/6 |
| 5,283,686 | 2/1994 | Huber | 359/337 |
| 5,579,143 | 11/1996 | Huber | 359/130 |
| 5,608,825 | 3/1997 | Ip | 385/24 |
| 5,627,848 | 5/1997 | Fermann et al. | 372/18 |
| 5,633,748 | 5/1997 | Perez et al. | 359/325 |
| 5,636,301 | 6/1997 | O'Sullivan et al. | 385/24 |
| 5,638,473 | 6/1997 | Byron | 385/37 |

FOREIGN PATENT DOCUMENTS 2 295 247   5/1996   United Kingdom .

OTHER PUBLICATIONS

"Ytterbium–Doped Fiber Amplifiers" by Rüdiger Paschotta, Johan Nilsson, Anne C. Tropper and David C. Hanna, *IEEE Journal of Quantum Electronics*, vol. 33, No. 7, Jul. 1997.

*Primary Examiner*—Brian Healy
*Attorney, Agent, or Firm*—McCormick, Paulding & Huber LLP

[57] ABSTRACT

A rare earth doped fiber for use in a fiber laser is presented. The fiber laser uses a single stripe broad area pump diode permits Yb lasing in its 3-level transition at 980 nm preferentially over the 1010 nm 4-level transition. The present fiber laser is characterized by a dual cladding fiber geometry which includes an inner rare earth doped single mode core. There is an inner cladding designed to be a multimode pump core for the pump light. The pump core is followed by a final cladding to confine the pump radiation. The present laser matches the larger/outer mode field to that of a single stripe broad area diode in order to maximize the pump intensity.

27 Claims, 3 Drawing Sheets

HIGH POWER THREE LEVEL FIBER LASER AND METHOD OF MAKING SAME

TECHNICAL FIELD

The present invention relates to the field of fiber lasers generally and more particularly to fiber lasers adapted to lase in a three level transition.

BACKGROUND OF THE INVENTION

High power, low-noise erbium doped fiber amplifiers (EDFA) are required in dense wavelength division multiplexed communication links. Current 32 and 40 channel links are estimated to require EDFAs having output powers in excess of 22 dBm and uniform gain over a 32 nm bandwidth. These EDFAs require high power single mode pump lasers to efficiently pump the single mode erbium fiber.

Cost effective, high-power, single transverse-mode, EDFA pump sources are not found in the prior art. Single mode pump diode technology is limited to kink free fiber coupled output powers in the 175 mW regime. Although these sources can be wavelength division multiplexed together to achieve required pump powers, this approach is both costly and bulky. Current cost estimates indicate $17,600 for a multiplexed 450 mW pump source.

A 500 mW, Ytterbium (Yb) fiber laser requires approximately 1.5 W of 917 nm laser diode pump power at a receiving facet. This level of pump power can be reliably achieved using a broad area, multi-transverse-mode diode laser having a 100 $\mu$m by 5 tm stripe. Since basic physics precludes efficient coupling of the output from the broad area diode into a single mode fiber, an alternate pumping scheme must be used.

Efficient pumping of rare earth doped fiber lasers using broad area laser diodes has previously been achieved using a double clad fiber. Known dual clad amplifier or laser fibers includes an inner rare earth doped single mode core and an inner cladding which support the lasing or signal wavelength. The inner cladding to the lasing core is designed to be a multimode core for the pump light. The inner cladding is followed by a final, outer cladding to confine the pump radiation.

An example of a known fiber laser is disclosed in U.S. Pat. No. 4,815,079 assigned to the Polaroid Corporation. The '079 fiber laser is characterized by a single mode core disposed within a relatively large multimode inner cladding. The inner cladding is surrounded by a further layer to prevent radiation from propagating out of the cladding.

Pump core dimensions of the commercially available Polaroid double clad fiber laser are 4.3 $\mu$m for the circular inner core diameter, 170 mm×330 mm, for a rectangular inner cladding and an outer fiber diameter of 630 $\mu$m. This fiber has been used to make high power Yb fiber lasers which operate at 1.010 $\mu$m.

SUMMARY OF THE INVENTION

An object of the present invention is to provide a dual clad laser fiber which maximizes the intensity (W/cm$^2$) of a single stripe broad area pump diode.

Another object of the present invention is to provide a laser of the foregoing type characterized by tightly confined multimode radiation.

A further object of the present invention is provide a highly efficient, high power, three level Yb fiber laser which lases preferentially at about 980 nm as opposed to the 1010 nm 4-level transition.

Yet another object of the present invention is to provide a dual clad laser fiber of the foregoing type fiber that is compatible with conventional fiber end preparation and splicing techniques required for laser attachment and connecting to other optical fibers.

Still another object of the present invention is to provide a laser of the foregoing type having a dual clad fiber design which matches the larger/outer mode field to that of a single stripe broad area diode in order to maximize the pump intensity.

According to the present invention, a method of fabricating a rare earth doped fiber for use in a fiber laser includes the steps of providing a silica substrate tube; depositing a layer of homogenous silica glass film on the silica substrate tube and doping said silica glass film with index-lowering dopants to form an outer cladding. The method also includes the steps of depositing a soot deposit of silica to form an inner core having an index of refraction greater than the outer cladding; soaking the preform in a Yb-containing solution to dope the soot material and form a composite preform fiber and heating the composite preform fiber to form a consolidated fiber. Further steps in the present method are grinding in said consolidated fiber a pair of slots equal in magnitude and opposing one another about an axis of the inner core and heating said slot ground fiber to a temperature at which the silica flows to form an inner cladding about the inner core.

According to another aspect of the present invention, a dual clad fiber laser includes an optical pump for generating an optical pumping signal in response to command signals. There is a dual clad optical fiber having a first end for receiving the optical pump signal and a second end for presenting a laser signal. The fiber has an inner core for providing single mode transmission of the laser signal, an inner cladding disposed adjacent the inner core for providing a pump core configured to match a laser mode field geometry of the optical pumping signal to couple said optical pumping signal to the inner core and an outer cladding disposed adjacent the inner cladding having an index of refraction less than the inner cladding for confining the optical pumping signal. The laser also includes a first reflector grating positioned adjacent the first optical fiber end for providing refection of the laser signal of a selected magnitude. A second reflector grating is positioned adjacent the second optical fiber end for providing refection of the laser signal of a magnitude selected to be substantially less than the reflection magnitude of the first reflector. A pickoff coupler is adapted to receive the laser signal from either the first or the second reflector for providing a feedback signal indicative of the laser signal power. A controller provides command signals to the optical pumping means in response to the feedback signal to operate the optical pumping means at a select power.

According to yet another aspect of the present invention, a laser amplifier for amplifying an input optical signal includes a rare earth doped optical fiber for receiving the input optical signal, an optical coupler for coupling a coherent optical pumping signal to the rare earth doped optical fiber. The fiber laser has an optical pumping means for generating an optical pumping signal in response to command signals; a dual clad optical fiber having a first end for receiving the optical pump signal and a second end for presenting a laser signal. The dual clad optical fiber has inner core for providing single mode transmission of the laser signal; an inner cladding disposed adjacent the inner core for providing a pump core configured to match a laser mode field geometry of the optical pumping signal to optically couple the optical pumping signal to the inner core. There is also an outer cladding disposed adjacent the inner cladding having an index of refraction less than the inner cladding for confining the optical pumping signal; a first reflector grating positioned adjacent the first optical fiber end for providing refection of the laser signal of a selected wavelength and magnitude; a second reflector grating positioned adjacent the second optical fiber end for providing refection of the laser signal of a magnitude selected to be substantially less than the reflection magnitude of the first reflector. Also included is a pickoff coupler adapted to receive the laser signal from the first or second reflector for providing a feedback signal indicative of the laser signal power and a controller for providing command signals to the optical pumping means in response to the feedback signal to operate the optical pumping means at a select power.

DESCRIPTION OF THE PREFERRED EMBODIMENT

Ytterbium can lase in either a 3-level, 974 nm transition or a 4-level, 1010 nm–1162 nm, transition. The operation of a 3-level Yb laser is shown in simplified form in FIG. 1. Radiation 10 from a pump source raises the energy of atoms form a ground state 12 to an excited state 14. There is a negligible lifetime of the atoms in excited state 14 before transition to the upper lasing level 16 which has a lifetime of 0.77 ms. Optical emission and absorption occur between level 16 and ground state 12 as schematically illustrated at 18. When the condition of population inversion exists, where more ions have electrons in the excited state 16 than in the ground state 12, the medium is said to exhibit gain at the wavelength determined by the energy difference between levels 16 and 12. When there are more ions in the ground state 12 than in level 16 the medium is lossy at the wavelength determined by the energy difference between levels 16 and 12. In order for amplification or lasing to occur, the medium must be pumped sufficiently to achieve gain.

Figure 1:
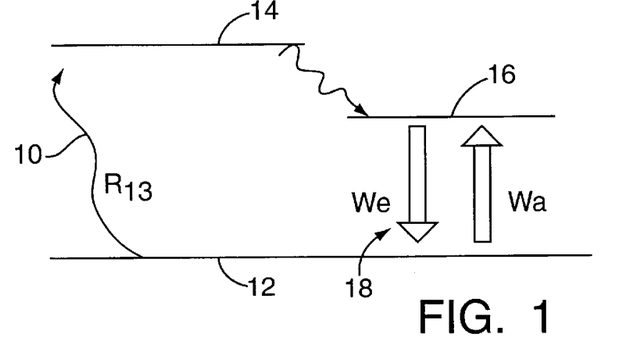
FIG. 1 is a simplified diagrammatic illustration of a three level laser transition characteristic of a laser made in accordance with the present invention.

The gain in a Yb laser maybe found by solving the appropriate atomic rate equations. The rate equations governing steady state ion population densities (Ni) in the three level system may be written if given the transition rates ($R_{13}$, $W_a$, and $W_e$) shown in FIG. 1, the spontaneous lifetimes ($\tau_{1-3}$), the stimulated pump absorption cross-section for ground state absorption ($\delta p$), the stimulated emission cross-section for the lasing transition ($\delta e$), the stimulated absorption cross-section for the lasing transition ($\delta a$), the pump and signal photon intensities in the fiber ($I_p$ and $I_s$), and the pump and signal photon energies ($hv_p$ and $hv_s$). In the case where the spontaneous lifetime, $\tau_{32}$, is much shorter than $\tau_{21}$, the ion population densities are given by, $$N_1 = N_0 \left[ \frac{W_e + \frac{1}{\tau_{21}}}{W_a + W_e + \frac{1}{\tau_{21}} + R_{13}} \right] \qquad \text{Eqn. 1}$$

$$N_2 = N_0 \left[ \frac{W_a + R_{13}}{W_a + W_e + \frac{1}{\tau_{21}} + R_{13}} \right] \qquad \text{Eqn. 2}$$

were the total population satisfies $$N_0 = N_1 + N_2 \qquad \text{Eqn. 3}$$

since N3 can be considered negligible due to its short lifetime. In these rate equations, the transition rates are given by $R_{13} = \delta_p I_p / hv_p$, $W_a = \delta_a I_s / hv_s$, and $W_e = \delta_e I_s / hv_s$.

The gain is defined in terms of the net steady state ion population densities as $$\text{Gain} = \delta_e N_2 - \delta_a N_1 = \alpha_0 / (1 + I/I_{sat}) \qquad \text{Eqn. 4}$$

where $$\alpha_0 = N_0 \frac{\sigma_e \tau_{21} R_{13} - \sigma_a}{1 + \tau_{21} R_{13}} \qquad \text{Eqn. 5}$$

$$I_{sat} = \frac{hv_s \left[ R_{13} + \frac{1}{\tau_{21}} \right]}{\sigma_a - \sigma_e} \qquad \text{Eqn. 6}$$

Figure 2:
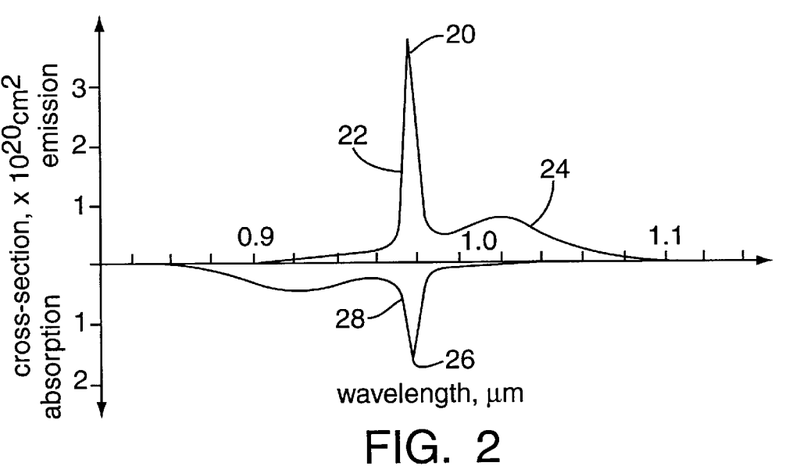
FIG. 2 is a simplified diagrammatic illustration of emission and absorption cross section for a laser provided by the present invention.

In Yb, the 3-level transition has significantly higher gain than the 4-level transition as indicated by the above equations and the absorption and emission cross-sections shown diagramatically in FIG. 2. Peak 20 in curve 22 corresponds to the emission cross-section of a three level transition laser (974 nm) with a 10 nm full width at half maximum (FWHM), while peak 24 corresponds to the emission cross-section in the 4-level transition between 1010 and 1162 nm, yielding a FWHM of 50 nm. There is a 4:1 emission cross section ratio when the 3-level transition is compared with a 4-level transition so that the gain is higher unless the fiber length is such that reabsorption losses reduce the gain below that of the four-level transition.

The 3-level transition can suffer significant reabsorption losses if not sufficiently pumped. This excess loss is shown by peak 26 in curve 28. In order to lase at 974 nm and avoid significant re-absorption losses, the Yb fiber must be "bleached" (i.e., excite approximately one-half lasing atoms into an excited state) along a substantial part of its length.

The fiber is bleached when $\alpha_0 = 0$ or when $$I_{pump} \geq I_{pump}^{sat} \qquad \text{Eqn. 7}$$

or $$I_p \geq \frac{\sigma_a h\nu_p}{\sigma_e \sigma_p \tau_{21}}$$ Eqn. 8

The laser rate equations estimate that a minimum pump intensity of 26.2 kW/cm$^2$ is required to bleach a Yb doped fiber. If it is assumed that the modal area of the pump field is equal to the area of the pump core, the minimum required power along the length of the fiber can be calculated. While this intensity is easily achieved with 6.3 mW of pump power in single mode fiber having a mode field diameter of 5.5 μm, it is much more difficult to achieve in the commercially available Polaroid fiber described in the '079 patent. In a fiber having a pump 170 mm×330 mm, a pump power of 14.7 W is required to sufficiently bleach the fiber region to enable the 3-level transition. Achieving this power level is not practical with broad-area single-stripe diode technology.

Figure 3:
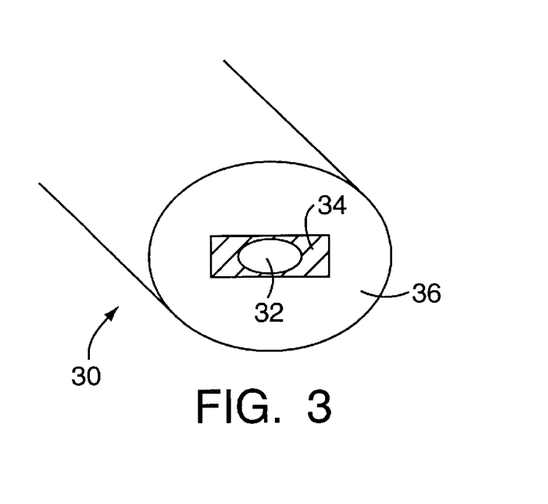
FIG. 3 is a simplified schematic illustration of a portion of a dual clad fiber provided according to the present invention.

One solution to reaching these intensities is provided by the present fiber which is characterized by a much stronger pump mode confinement. Referring now to FIG. 3 there is shown in simplified schematic illustration of a portion of a dual clad fiber 30 provided according to the present invention. The fiber 30 has an inner core 32 which is encompassed by an inner cladding 34 that operates as a multimode pump core. The pump core is followed by a final, outer cladding 36 to confine the pump radiation. The present fiber allows a match of the larger/outer mode field diameter to that of a single stripe broad area diode in order to maximize the pump intensity. This design is critical in making Yb laser preferentially in a 3-level transition at 980 nm over the 1010 nm 4-level transition.

The inner cladding which constitutes the pump core has an approximate 100 μm by 5 lm dimension in the preferred embodiment to match a laser diode stripe. The pump core dimensions are adjusted to match the laser mode field diameter and achieve efficient coupling of the pump radiation. The present invention results in a fiber dual-clad gain fiber in which an Yb-doped silica inner core is located within a 5×100 μm pump core that acts as the waveguide cladding as it has a lower index of refraction. This assembly is centered in a circular silica fiber which acts as the outer optical waveguide cladding.

With a fiber of the present invention, the single mode core interacts with both fiber claddings to affect its light propagation properties. The resulting waveguide features effective V-value, as defined by the following equation, which is different for orthogonal axes of the waveguide.

$$V = \pi d / \lambda_{op} \cdot NA$$ Eq.9

In Eq. 9, $d$ is the core diameter, NA is the numerical aperture of the fiber, and $\lambda_{op}$ is the operating wavelength. For single mode operation, the V-value must be kept below 2.405. Practical fiber designs feature V-values in the 2.0–2.2 range where the waveguide is safely below single mode cutoff, and a large portion of the mode energy is confined in the core region of the waveguide. The energy confinement factor of a single mode waveguide can be viewed as the ratio of mode size (mode field diameter) to the core diameter, and should not exceed 115–120%. At this point, modal energy distribution is not well confined to the core region and is subject to radiative losses. This confinement is especially important to the fiber's resistance to bending losses. Fiber bending can then be used to achieve thorough mode mixing.

Figure 7:
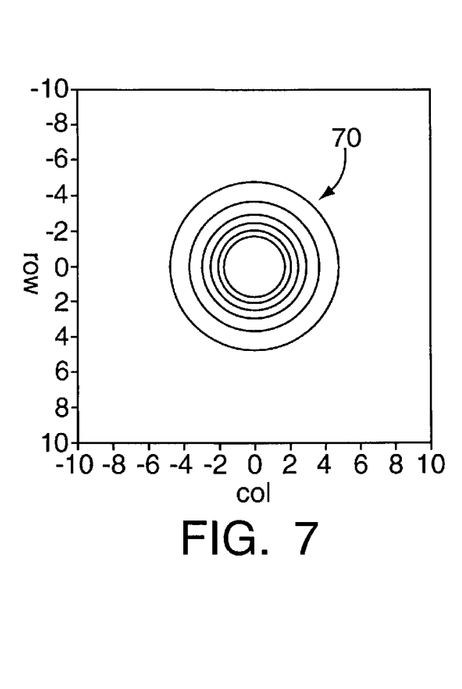
FIG. 7 is a simplified diagrammatic illustration of mode field plots for both the vertical and horizontal electric fields of a prior art device.

In the Polaroid patent '070, the waveguide core is guided with a single cladding region which results in a circular mode distribution at a constant wavelength operating under a target 2.0–2.2 V-value, so that this confinement is evenly distributed. FIG. 7 is a diagrammatic illustration of the mode fields of a single core fiber laser of the type disclosed in the '070 patent. Curves 70 correspond to lines of equal field strength for both the horizontal E field (TE00) and vertical E field (TM00). In FIG. 7, n1=1.477 with a 4 μm core and n2=n3=1.473. The mode size is 6.6 μm×6.6 μm and Neff= 1.4738.

In contrast, the present fiber exploits a variable confinement distribution along the waveguide to yield a fiber with polarization control that greatly enhances the performance of the fiber. The present invention utilizes a narrowing of the primary cladding region along its small axis to either be intimate with, or approach within 110% the diameter of the core. With this configuration, a practical single mode waveguide with V-value between 2.0–2.2 will have a 10–15% proportion of light propagating along this axis outside of the core, which will travel through the narrow primary cladding region where it will interact with the secondary cladding. The lower refractive index of the secondary cladding changes the effective V-value and corresponding mode diameter of the fiber orthogonal axes, resulting in an elliptical mode profile.

Figure 8:
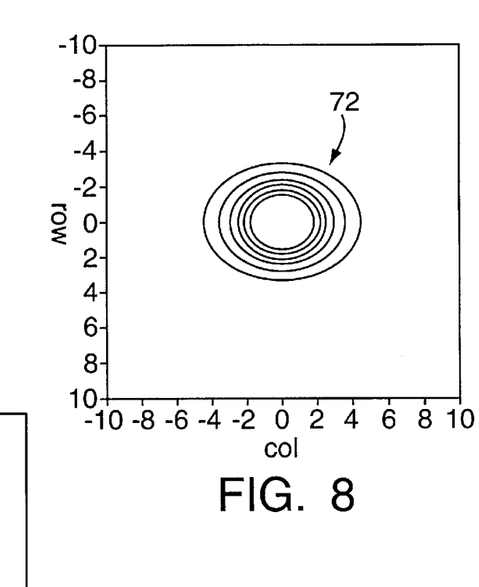
FIG. 8 is a simplified diagrammatic illustration of a mode field plot for a horizontal electric field (TE) for a laser provided by the present invention.
Figure 9:
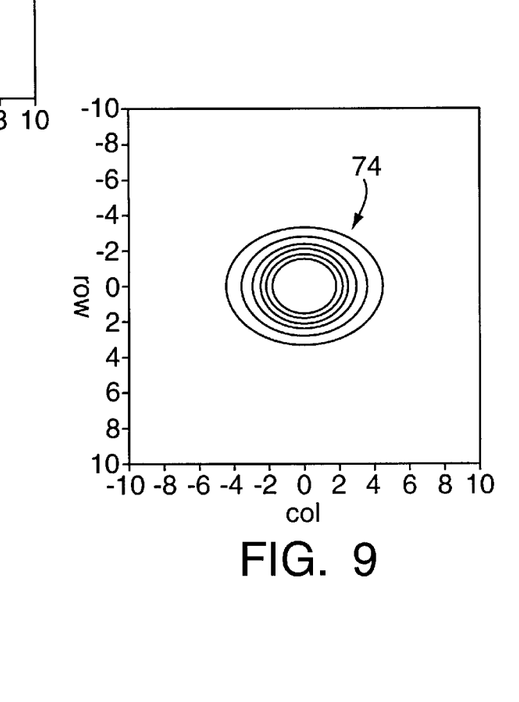
FIG. 9 is a simplified diagrammatic illustration of a mode field plot for a vertical electric field (TM) for a laser provided by the present invention.

Examples of the foregoing are shown in FIGS. 8 and 9. Curves 72 in FIG. 8 and curves 74 in FIG. 9 respectively correspond to the TE00 mode and the TM00 mode. For a fiber laser producing this mode configuration, there is a double uniaxial core with n1=1.477 (4 μm core diameter), n2=1.473 inner cladding ellipse of 4 μm×100 μm) and the outer cladding has an index of refraction n3=1.470. In FIG. 8 the TE00 mode has a mode size of 6.4 μm×5.0 μm with neff=1.4732. The TM00 mode of FIG. 9 has a mode size of 6.4 μm×5.0 μm with Neff=1.4732.

As an example, a fiber laser in accordance with the present invention with a 4.0 mm diameter core region and a refractive index of 1.477 can be positioned in the center of a 4×100 mm primary cladding region with a refractive index of 1.473. An outer circular cladding with a refractive index of 1.470 surrounds this waveguide element. (1) With these parameters, and with a constant V-value of 2.20, the mode profile at 980 nm is 6.4 mm×5.0 mm according to the following solutions:

Mode Along Minor Primary Cladding Axis: V (2.2)=π5.0 mm/0.98 mm·0.14

Mode Along Major Primary Cladding Axis: V (2.2)=π6.4 mm/0.98 mm·0.10

The elliptical mode profile exhibits some geometrical modal birefringence leading to polarization maintaining performance of the fiber laser. Because the polarization eigenmodes of this waveguide design are aligned with that of the primary cladding axes, simple mechanical alignment of the fiber so that the cladding ellipse is coupled efficiently to the divergence of the output of the laser promotes good polarization alignment as well. In addition to polarization control, this configuration differs from the '.070 device in not requiring offset-core positioning to enhance coupling of pump energy. A fiber having the foregoing geometry reduces to 131 mW the pump power necessary to bleach the fiber for 980 nm lasing and 920 pumping.

The fiber 30 is fabricated by a process provided by the present invention. The fiber 30 presents a cost effective approach to making a 980 nm Yb fiber laser. Current cost estimates indicate the present invention enables a fiber laser to be constructed for about $3000 for a 500 mW, single mode, Yb fiber-laser. It should be noted that the foregoing cost estimate can be reduced significantly, depending on the origin of the laser components. In contrast, a prior art device having 4×140 mW WDM coupled diodes that also generates 500 mW costs between $8,000 and $17,600, in accordance with the source of component parts.

(1) For silice ater cladding having n=1.458 all of the forgoing indices would be reduced by 0.012.

Figure 4:
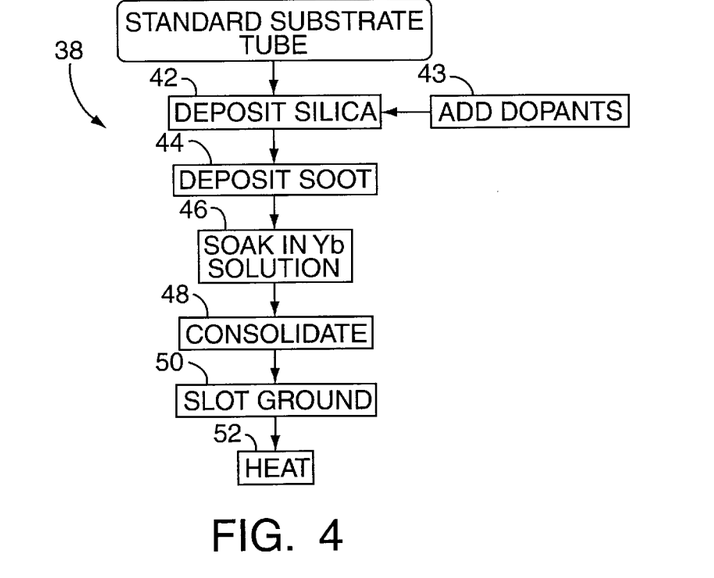
FIG. 4 is a diagrammatic illustration of a process used to fabricate the dual clad laser of FIG. 3.

The foregoing fiber can be fabricated by a process 38 described with respect to FIG. 4. The fabrication process starts with a standard silica or fluorinated silica substrate tube 40 which forms the outer glass section and secondary cladding region of the fiber shown schematically in FIG. 3 as outer cladding 36. A layer of homogenous silica glass films doped with index-raising dopants such as germanium are deposited (block 42) with standard MCVD processing. This glass cladding composition is designed to have roughly 0.3% or greater index of refraction difference than the material of the substrate tube for reasonable waveguiding of 0.12 or more numerical aperture of the resultant multimode waveguide. In addition, dopants such as phosphorus are added to this glass cladding composition to significantly lower the glass melting point. After this region, a soot deposit of silica with even higher levels of index-raising dopants is deposited (block 44) to form the inner core glass, and the composite tube soaked in Yb-containing solution (block 46) to dope the soot material. The composite preform is then heated (block 48) and consolidated into a solid rod.

The preform rod is then slot ground (block 50) with equal and opposing slots around one axis of the inner core. The ground preform is then heated (block 52) to a temperature in which the silica softens and flows. At this temperature, the fiber flows to its lowest energy, circular configuration. The cladding glass, having a lower melting point, is more viscous and fluid, and distorts into its final rectangular form. The inner Yb-doped core however, in having a melt point significantly higher, maintains its circular shape.

The fiber design of this invention offers unique advantages in device packaging and integration over other more traditional cladding pump fibers. Traditional cladding-pump fibers incorporate rectangular or elliptically shaped glass structures that require highly specialized and difficult splicing and laser pigtailing techniques. The fiber design of the present invention uses a circular outer geometry of 125 μm that is compatible with conventional fiber end preparation and splicing techniques required for laser attachment and connecting to other optical fibers.

Alternative configurations to the preferred embodiment are also contemplated by the present invention. Specifically, the pump core may be varied in dimension. For example, a fiber made in accordance with the present invention can have a pump core of 100 μm in diameter with a pump area of $7.9\times10^{-5}$ cm$^2$. This alternative pump core will require a minimum pump power of 2 W which can be obtained by polarization multiplexing two broad area diodes together. In contrast, fiber laser made in accordance with the '079 patent has a pump area of $6.4\times10^{-4}$ cm$^2$, requiring a minimum pump power of 14.7 W to enable three level transition operation.

Figure 5:
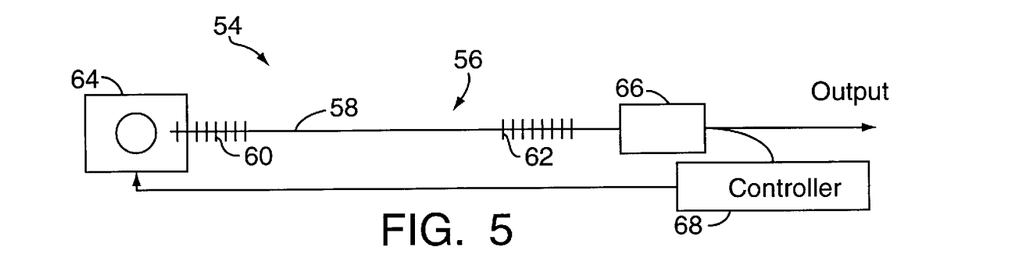
FIG. 5 is a simplified schematic illustration of a laser provided according to the present invention having a dual clad fiber of the type shown with respect to FIG. 3.

One embodiment of a Yb fiber laser 54 provided by the present invention is shown in FIG. 5. As shown a fiber Bragg grating resonator 56 is formed in an appropriate length of Yb fiber 58 as detailed hereinabove by writing a high reflector grating 60 at the pump end the resonator and a very low reflector grating 62 which functions as an output coupler. Fiber length and dopant concentration are chosen to optimize the laser efficiency and output power. Fiber design and packaging techniques, such as offset Yb core, fiber bend and fiber twist, are used to ensure sufficient mode mixing within the multimode pump core so that the 3-level Yb doped lasing core is bleached along its entire length. The highly reflecting grating is chosen to ensure that the pump diode is not destabilized by the 980 nm output from the fiber laser. The Yb fiber laser resonator is pigtailed to a 1.5 W broad area 917 nm pump laser diode 64. The fiber laser is followed by a 0.1% pickoff coupler 66 to monitor the 980 nm laser power. The pickoff coupler is designed to be stable and to ensure that only the 980 nm laser power is monitored. This signal is used to stabilize and monitor the fiber laser power. A controller 68 is included which receives a signal from the pickoff coupler and provides a feedback signal to the pump laser diode to stabilize its output. It is noted that this monitor function could reside between the pump diode laser and the fiber laser.

The fiber laser is capable of generating approximately 500 mW of laser power for a 1.5 W pump diode. This value assumes 75% coupling efficiency to the fiber, 131 mW of pump power at the end of the fiber laser to ensure effective bleaching of the fiber and a 65% fiber laser slope efficiency.

Figure 6:
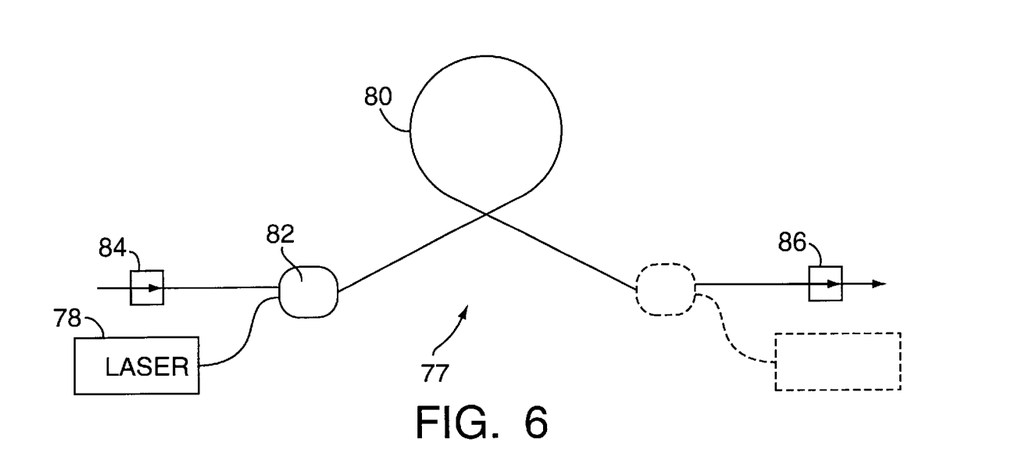
FIG. 6 is a simplified schematic illustration of a laser amplifier provided in accordance with the present invention.

Another embodiment of the present invention is a laser amplifier 77 as schematically shown in FIG. 6. In this embodiment, a fiber laser 78 of the type set forth hereinabove is used to optically pump a length of erbium doped fiber 80. The laser amplifier also includes an optical coupler 82 (980/1550 nm) which presents the output beam from the fiber laser 78 to the fiber 80. There are optical isolators 84, 86 to provide the requisite isolation so that lasing within the amplifier does not occur. As shown in phantom, the fiber laser 78 can also be positioned toward the output end of the laser amplifier.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention. For example, fibers doped with other appropriate rare earth elements can be used to fabricate the devices set forth herein for 3- level transition operation at other wavelengths.

We claim:

1. A method of fabricating a rare earth doped fiber for use in a fiber laser, said method comprising the steps of:

providing a silica substrate tube;

depositing a layer of homogenous silica glass film on said silica substrate tube;

doping said silica glass film with index-raising dopants to form an outer cladding;

depositing a soot deposit of silica to form an inner core having an index of refraction greater than said outer cladding;

soaking said fiber in a fare earth element-containing solution to dope the soot material and form a composite preform fiber;

heating said composite preform fiber to form a consolidated fiber;

grinding in said consolidated fiber a pair of slots equal in magnitude and opposing one another about an axis of said inner core;

heating said slot ground fiber to a temperature at which the silica flows to form an inner cladding about said inner core.

2. The method of claim 1 further comprising the steps of depositing dopants in said outer cladding to form a region of said substrate tube with a different index of refraction than said substrate tube material.

3. The method of claim 1 further comprising the steps of depositing dopants in said outer cladding to significantly lower the glass melting point.

4. The method of claim 3 further comprising the steps of providing phosphorus as a dopant.

5. The method of claim 1 further comprising the steps of providing a fluorinated silica substrate tube.

6. The method of claim 1 further comprising the steps of doping said fluorinated silica substrate tube to have at least 0.3% index of refraction difference between than said substrate tube material.

7. The method of claim 1 further comprising the steps of depositing dopants further comprises depositing germanium with MCVD processing.

8. An optical fiber for use in a fiber laser made in accordance with a method comprising the steps of:
   providing a silica substrate tube;
   depositing a layer of homogenous silica glass film on said silica substrate tube;
   doping said silica glass film with index-raising dopants to form an outer cladding;
   depositing a soot deposit of silica to form an inner core having an index of refraction greater than said outer cladding;
   soaking said fiber in a rare earth element-containing solution to dope the soot material and form a composite preform fiber;
   heating said composite preform fiber to form a consolidated fiber;
   grinding in said consolidated fiber a pair of slots equal in magnitude and opposing one another about an axis of said inner core; and
   heating said slot ground fiber to a temperature at which the silica flows to form an inner cladding about said inner core.

9. The fiber of claim 8 wherein said method further comprises the steps of providing phosphorus as a dopant.

10. The fiber of claim 8 wherein said method further comprises the steps of providing a fluorinated silica substrate tube.

11. The optical fiber of claim 8 wherein said method further comprises the steps of doping said fluorinated silica substrate tube to have at least 0.3% index of refraction difference greater than said substrate tube material.

12. A fiber laser comprising:
   an optical pumping means for generating an optical pumping signal in response to command signals;
   a dual clad optical fiber having a first end for receiving said optical pump signal and a second end for presenting a laser signal, said fiber including
      an inner core for providing single mode transmission of said laser signal;
      an inner cladding disposed adjacent said inner core for providing a pump core configured to match a laser mode field geometry of said optical pumping signal to optically couple said optical pumping signal to said inner core; and
      an outer cladding disposed adjacent said inner cladding having an index of refraction less than said inner cladding for confining said optical pumping signal;
   a first reflector positioned adjacent said first optical fiber end for providing refection of said laser signal of a selected magnitude; and
   a second reflector positioned adjacent said second optical fiber end for providing refection of said laser signal of a magnitude selected to be substantially less than the reflection magnitude of said first reflector.

13. A fiber laser comprising:
   an optical pumping means for providing an optical pumping signal in response to command signals;
   a dual clad optical fiber having a first end for receiving said optical pump signal and a second end for presenting a laser signal, said fiber including
      an inner core for providing single mode transmission of said laser signal;
      an inner cladding disposed adjacent said inner core for providing a pump core configured to match a laser mode field geometry of said optical pumping signal to optically couple said optical pumping signal to said inner core; and
      an outer cladding disposed adjacent said inner cladding having an index of refraction less than said inner cladding for confining said optical pumping signal;
   a first reflector positioned adjacent said first optical fiber end for providing reflection of said laser signal of a selected magnitude;
   a second reflector positioned adjacent said second optical fiber end for providing reflection of said laser signal of a magnitude selected to be substantially less than the reflection magnitude of said first reflector; and
wherein said inner cladding has about 4 mm by 100 mm cross sectional dimensions.

14. A fiber laser comprising:
   an optical pumping means for providing an optical pumping signal in response to command signals;
   a dual clad optical fiber having a first end for receiving said optical pump signal and a second end for presenting a laser signal, said fiber including
      an inner core for providing single mode transmission of said laser signal;
      an inner cladding disposed adjacent said inner core for providing a pump core configured to match a laser mode field geometry of said optical pumping signal to optically couple said optical pumping signal to said inner core; and
      an outer cladding disposed adjacent said inner cladding having an index of refraction less than said inner cladding for confining said optical pumping signal;
   a first reflector positioned adjacent said first optical fiber end for providing reflection of said laser signal of a selected magnitude;
   a second reflector positioned adjacent said second optical fiber end for providing reflection of said laser signal of a magnitude selected to be substantially less than the reflection magnitude of said first reflector; and
wherein said inner core is centered in said inner cladding which has a cross section between 50 mm and 100 mm as a diameter.

15. A fiber laser comprising:
   an optical pumping means for providing an optical pumping signal in response to command signals;
   a dual clad optical fiber having a first end for receiving said optical pump signal and a second end for presenting a laser signal said fiber including
      an inner core for providing single mode transmission of said laser signal;
      an inner cladding disposed adjacent said inner core for providing a pump core configured to match a laser mode field geometry of said optical pumping signal to optically couple said optical pumping signal to said inner core; and an outer cladding disposed adjacent said inner cladding having an index of refraction less than said inner cladding for confining said optical pumping signal;

a first reflector positioned adjacent said first optical fiber end for providing reflection of said laser signal of a selected magnitude;

a second reflector positioned adjacent said second optical fiber end for providing reflection of said laser signal of a magnitude selected to be substantially less than the reflection magnitude of said first reflector; and wherein said fiber inner core is doped with Ytterbium (Yb) and said optical pumping signal has a wavelength of approximately 917 nm and a power of about 1.5 W.

16. A fiber laser comprising:

an optical pumping means for providing an optical pumping signal in response to command signals;

a dual clad optical fiber having a first end for receiving said optical pump signal and a second end for presenting a laser signal, said fiber including an inner core for providing single mode transmission of said laser signal;

an inner cladding disposed adjacent said inner core for providing a pump core configured to match a laser mode field geometry of said optical pumping signal to optically couple said optical pumping signal to said inner core; and an outer cladding disposed adjacent said inner cladding having an index of refraction less than said inner cladding for confining said optical pumping signal;

a first reflector positioned adjacent said first optical fiber end for providing reflection of said laser signal of a selected magnitude;

a second reflector positioned adjacent said second optical fiber end for providing reflection of said laser signal of a magnitude selected to be substantially less than the reflection magnitude of said first reflector; and wherein said optical pumping means further comprises a broad area multi-transverse mode diode laser.

17. A fiber laser comprising:

an optical pumping means for providing an optical pumping signal in response to command signals;

a dual clad optical fiber having a first end for receiving said optical pump signal and a second end for presenting a laser signal, said fiber including an inner core for providing single mode transmission of said laser signal;

an inner cladding disposed adjacent said inner core for providing a pump core configured to match a laser mode field geometry of said optical pumping signal to optically couple said optical pumping signal to said inner core; and an outer cladding disposed adjacent said inner cladding having an index of refraction less than said inner cladding for confining said optical pumping signal;

a first reflector positioned adjacent said first optical fiber end for providing reflection of said laser signal of a selected magnitude;

a second reflector positioned adjacent said second optical fiber end for providing reflection of said laser signal of a magnitude selected to be substantially less than the reflection magnitude of said first reflector; and wherein said laser signal has a wavelength of approximately 974 nm.

18. A fiber laser comprising:

an optical pumping means for providing an optical pumping signal in response to command signals;

a dual clad optical fiber having a first end for receiving said optical pump signal and a second end for presenting a laser signal, said fiber including an inner core for providing single mode transmission of said laser signal;

an inner cladding disposed adjacent said inner core for providing a pump core configured to match a laser mode field geometry of said optical pumping signal to optically couple said optical pumping signal to said inner core; and an outer cladding disposed adjacent said inner cladding having an index of refraction less than said inner cladding for confining said optical pumping signal;

a first reflector positioned adjacent said first optical fiber end for providing reflection of said laser signal of a selected magnitude;

a second reflector positioned adjacent said second optical fiber end for providing reflection of said laser signal of a magnitude selected to be substantially less than the reflection magnitude of said first reflector; and wherein said outer cladding has a circular geometry directly compatible with a receiving end of a 125 mm optical fiber.

19. A fiber laser comprising:

an optical pumping means for providing an optical pumping signal in response to command signals;

a dual clad optical fiber having a first end for receiving said optical pump signal and a second end for presenting a laser signal, said fiber including an inner core for providing single mode transmission of said laser signal;

an inner cladding disposed adjacent said inner core for providing a pump core configured to match a laser mode field geometry of said optical pumping signal to optically couple said optical pumping signal to said inner core; and an outer cladding disposed adjacent said inner cladding having an index of refraction less than said inner cladding for confining said optical pumping signal;

a first reflector positioned adjacent said first optical fiber end for providing reflection of said laser signal of a selected magnitude;

a second reflector positioned adjacent said second optical fiber end for providing reflection of said laser signal of a magnitude selected to be substantially less than the reflection magnitude of said first reflector; and wherein said optical pumping signal is sufficient to enable 3-level transition operation.

20. A fiber laser comprising:

an optical pumping means for providing an optical pumping signal in response to command signals;

a dual clad optical fiber having a first end for receiving said optical pump signal and a second end for presenting a laser signal, said fiber including an inner core for providing single mode transmission of said laser signal;

an inner cladding disposed adjacent said inner core for providing a pump core configured to match a laser mode field geometry of said optical pumping signal to optically couple said optical pumping signal to said inner core; and an outer cladding disposed adjacent said inner cladding having an index of refraction less than said inner cladding for confining said optical pumping signal;

a first reflector positioned adjacent said first optical fiber end for providing reflection of said laser signal of a selected magnitude;

a second reflector positioned adjacent said second optical fiber end for providing reflection of said laser signal of a magnitude selected to be substantially less than the reflection magnitude of said first reflector; and wherein said laser signal has a wavelength of approximately 1.5 mm.

21. A fiber laser comprising:

an optical pumping means for providing an optical pumping signal in response to command signals;

a dual clad optical fiber having a first end for receiving said optical pump signal and a second end for presenting a laser signal, said fiber including an inner core for providing single mode transmission of said laser signal;

an inner cladding disposed adjacent said inner core for providing a pump core configured to match a laser mode field geometry of said optical pumping signal to optically couple said optical pumping signal to said inner core; and an outer cladding disposed adjacent said inner cladding having an index of refraction less than said inner cladding for confining said optical pumping signal;

a first reflector positioned adjacent said first optical fiber end for providing reflection of said laser signal of a selected magnitude;

a second reflector positioned adjacent said second optical fiber end for providing reflection of said laser signal of a magnitude selected to be substantially less than the reflection magnitude of said first reflector; and wherein said inner cladding optically communicates sufficiently with said optical pumping signal to enable 3-level transition operation.

22. A laser amplifier for amplifying an input optical signal, comprising:

a rare earth element doped optical fiber for receiving the input optical signal;

an optical coupler for coupling a coherent optical pumping signal to said rare earth doped optical fiber;

a fiber laser for providing said coherent optical pumping signal to said optical coupler, said fiber laser having an optical pumping means for generating an optical pumping signal in response to command signals;

a dual clad optical fiber having a first end for receiving said optical pump signal and a second end for presenting a laser signal, said fiber including an inner core for providing single mode transmission of said laser signal;

an inner cladding disposed adjacent said inner core for providing a pump core configured to match a laser mode field geometry of said optical pumping signal to optically couple said optical pumping signal to said inner core; and an outer cladding disposed adjacent said inner cladding having an index of refraction less than said inner cladding for confining said optical pumping signal;

a first reflector positioned adjacent said first optical fiber end for providing refection of said laser signal of a selected magnitude;

a second reflector positioned adjacent said second optical fiber end for providing refection of said laser signal of a magnitude selected to be substantially less than the reflection magnitude of said first reflector;

a pickoff coupler adapted to receive said laser signal from said second reflector for providing a feedback signal indicative of said laser signal power; and a controller for providing command signals to said optical pumping means in response to said feedback signal to operate said optical pumping means at a select power.

23. The laser amplifier of claim 20 further comprising an optical isolator to optically isolate said rare earth doped optical fiber from optical fiber adjacent therewith.

24. The laser amplifier of claim 20 wherein said inner cladding optically communicates sufficiently with said optical pumping signal to enable 3-level transition operation.

25. The method of claim 1 wherein said rare earth element comprises a member of the group consisting essentially of Yttrium, Praseodymium, Promethium, Erbium and Ytterbium.

26. The optical fiber of claim 8 wherein said rare earth element comprises a member of the group consisting esttentially of Yttrium, Praseodymium, Promethium, Erbium and Ytterbium.

27. The fiber laser of claim 12 further comprising:

a pickoff coupler adapted to receive said laser signal from said second reflector for providing a feedback signal indicative of said laser signal power; and a controller for providing command signals to said optical pumping means in response to said feedback signal to operate said optical pumping means at a select power.

* * * * *

UNITED STATES PATENT AND TRADEMARK OFFICE
CERTIFICATE OF CORRECTION

PATENT NO.  : 6,031,849
DATED       : February 29, 2000
INVENTOR(S) : Gary A. Ball et al.

It is certified that error appears in the above-identified patent and that said Letters Patent is hereby corrected as shown below:

Column 1,
Line 32, Delete "tm" and substitute -- µm --.
Line 53, Delete "170 mm x 330 mm." and substitute -- 170 µm x 330 µm --.

Column 5,
Line 16, Delete "pump 170 mmx330mm" and substitute -- 170 µm x 330 µm inner cladding --.
Line 35, Delete "5 lm" and substitute -- 5 µm --.

Column 6,
Line 30, Add -- ( -- after "1.473" and before "inner".
Line 36, Delete "4.0 mm" and substitute -- 4.0 µm --.
Line 38, Delete "4X100 mm" and substitute -- 4X100 µm --.
Line 42, Delete "6.4 mmX5.0 mm" and substitute -- 6.4 µmX5.0 µm --.
Line 45, Delete "mm/0.98 mm·0.14" and substitute -- µm/0.98 µm·0.14 --.
Line 47, Delete "mm/0.98 mm·0.10" and substitute -- µm/0.98 µm·0.10 --.
Line 60, After "920", insert -- nm --.

Claims,
Claim 13, column 10,
Line 26, Delete "4 mm by 100 mm" and substitute -- 4 µm by 100 µm --.

Claim 14, column 10,
Line 53, Delete "50 mm and 100 mm" and substitute -- 50 µm and 100 µm --.

Claim 18, column 12,
Line 22, Delete "125 mm" and substitute -- 125 µm --.

Claim 20, column 13,
Line 6, Delete "1.5 mm" and substitute -- 1.5 µm --.

UNITED STATES PATENT AND TRADEMARK OFFICE
CERTIFICATE OF CORRECTION

PATENT NO. : 6,031,849
DATED : February 29, 2000
INVENTOR(S) : Gary A. Ball et al.

Page 2 of 2

It is certified that error appears in the above-identified patent and that said Letters Patent is hereby corrected as shown below:

Drawings,
FIG. 2, Delete "cross-section, x $10^{20}$ cm$^2$" and substitute -- cross-section, x $10^{-20}$ cm$^2$ --.

Signed and Sealed this

Thirteenth Day of November, 2001

Attest:

Attesting Officer

NICHOLAS P. GODICI
Acting Director of the United States Patent and Trademark Office